(12) United States Patent
Kwok et al.

(10) Patent No.: US 12,441,767 B2
(45) Date of Patent: Oct. 14, 2025

(54) VENOM-BASED PEPTIDE AND APPLICATION THEREOF

(71) Applicant: University of Macau, Macau (CN)

(72) Inventors: Hang Fai Kwok, Macau (CN); Rui Ma, Macau (CN); Guokai Chen, Macau (CN)

(73) Assignee: UNIVERSITY OF MACAU, Macau (CN)

( * ) Notice: Subject to any disclaimer, the term of this patent is extended or adjusted under 35 U.S.C. 154(b) by 540 days.

(21) Appl. No.: 17/999,869

(22) PCT Filed: Jul. 21, 2020

(86) PCT No.: PCT/CN2020/103354
§ 371 (c)(1),
(2) Date: Nov. 25, 2022

(87) PCT Pub. No.: WO2021/237904
PCT Pub. Date: Dec. 2, 2021

(65) Prior Publication Data
US 2023/0287049 A1 Sep. 14, 2023

(30) Foreign Application Priority Data
May 28, 2020 (CN) .......................... 202010469590.8

(51) Int. Cl.
*C07K 7/08* (2006.01)
*C12N 5/0735* (2010.01)

(52) U.S. Cl.
CPC .............. *C07K 7/08* (2013.01); *C12N 5/0606* (2013.01); *C12N 2500/05* (2013.01); *C12N 2500/25* (2013.01); *C12N 2501/10* (2013.01); *C12N 2501/602* (2013.01); *C12N 2501/603* (2013.01); *C12N 2501/605* (2013.01); *C12N 2501/998* (2013.01)

(58) Field of Classification Search
None
See application file for complete search history.

(56) References Cited

FOREIGN PATENT DOCUMENTS

| CN | 1659273 A | 8/2005 |
|---|---|---|
| WO | 2017142388 A2 | 8/2017 |

OTHER PUBLICATIONS

Ma, R. et al. "Novel venom-based peptides (P13 and its derivative-M6) to maintain self renewal of human embryonic stem cells by activating FGF and TGFb signaling pathways" Stem Cell Research & Therapy, vol. 11, Jun. 18, 2020, pp. 1-2, 13-15, figure1-figure 9.
Li, B. et al. "Triggering of cancer cell cycle arrest by a novel scorpion venom-derived peptide_Gonearrestide" J Cell Mol Med., vol. 22, Dec. 31, 2018, abstract, pp. 4462-44632.7, p. 44653.2.1, Table S1.
Zhang, Wencai et al. "Research progress on in vitro culture expansion of human embryonic stem cells" Foreign Medical Sciences, Section of Pathophysiology and Clinical Medicine, vol. 25, No. 1, Feb. 28, 2005, pp. 83-87.
Oukkache, N. et al. "New analysis of the toxic compounds from the Androctonus mauretanicus mauretanicus scorpion venom" Toxicon, vol. 51, Dec. 17, 2007, pp. 835-852.

*Primary Examiner* — Kevin S Orwig
(74) *Attorney, Agent, or Firm* — EAGLE IP LIMITED (57) ABSTRACT

A venom-based peptide and an application thereof, which relate to the technical field of biomolecules. The amino acid sequence of the peptide is represented by formula 1: X1-X2-X3-X4-X5-X6-X7-X8-X9-X10-X11-X12-X13-X14-X15-X16-X17-X18; X1, X5, X6, X9 and X11 are each selected from any one among A, V, L, I, M, F, W and P; X2, X3, X10, X15, X17 and X18 are each selected from any one among G, C, S, T, Y, N and Q; X7 is selected from D or E; X4, X8 and X16 are each selected from any one among K, R and H; and X12, X13 and X14 are each selected from any one among K, R, H, D and E. The peptide has the function of promoting self-renewal of human embryonic stem cells.

13 Claims, 8 Drawing Sheets
Specification includes a Sequence Listing.

SEQUENCE LISTING

```
<160> NUMBER OF SEQ ID NOS: 5

<210> SEQ ID NO 1
<211> LENGTH: 18
<212> TYPE: PRT
<213> ORGANISM: Artificial sequence
<220> FEATURE:
<223> OTHER INFORMATION: Synthetic

<400> SEQUENCE: 1

Trp Cys Tyr Lys Leu Pro Asp Arg Val Ser Ile Lys Glu Lys Gly Arg
1               5                   10                  15

Cys Asn
```

```
<210> SEQ ID NO 2
<211> LENGTH: 18
<212> TYPE: PRT
<213> ORGANISM: Artificial sequence
<220> FEATURE:
<223> OTHER INFORMATION: Synthetic

<400> SEQUENCE: 2

Trp Cys Tyr Lys Leu Pro Asp Arg Val Ser Ile Glu Arg Arg Gly Arg
1               5                   10                  15

Cys Asn

<210> SEQ ID NO 3
<211> LENGTH: 18
<212> TYPE: PRT
<213> ORGANISM: Artificial sequence
<220> FEATURE:
<223> OTHER INFORMATION: Synthetic

<400> SEQUENCE: 3

Trp Cys Tyr Lys Leu Pro Asp Arg Val Ser Ile Glu Lys Lys Gly Arg
1               5                   10                  15

Cys Asn

<210> SEQ ID NO 4
<211> LENGTH: 18
<212> TYPE: PRT
<213> ORGANISM: Artificial sequence
<220> FEATURE:
<223> OTHER INFORMATION: Synthetic

<400> SEQUENCE: 4

Trp Arg Tyr Lys Leu Pro Asp Arg Val Ser Ile Glu Arg Arg Gly Arg
1               5                   10                  15

Cys Asn

<210> SEQ ID NO 5
<211> LENGTH: 18
<212> TYPE: PRT
<213> ORGANISM: Artificial sequence
<220> FEATURE:
<223> OTHER INFORMATION: Synthetic

<400> SEQUENCE: 5

Trp Arg Tyr Lys Leu Pro Lys Arg Val Ser Ile Glu Arg Arg Gly Arg
1               5                   10                  15

Cys Asn
```

VENOM-BASED PEPTIDE AND APPLICATION THEREOF

REFERENCE TO SEQUENCE LISTING

This application contains a sequence listing which has been submitted electronically in ASCII format and is hereby incorporated by reference in its entirety. Said ASCII copy, created on 16 May 2023, is named "00288706 U006.069.NPEUS EN-Sequence Listing-revised.txt" and is 1,565 bytes in size.

CROSS REFERENCE TO RELATED APPLICATION

The present application claims priority to the Chinese patent application no. 2020104695908 titled "VENOM-BASED PEPTIDE AND APPLICATION THEREOF" and filed with the China Patent Office on May 28, 2020, the entire contents of which are incorporated in the present application by reference.

TECHNICAL FIELD

The present disclosure relates to the technical field of biomolecules, in particular to a venom-based peptide and an application thereof.

BACKGROUND

The advantages of venom peptides derived from animals such as scorpions, spiders and snakes are that they have stable structures and have high specificity for target molecules due to more than one million years of adaptive evolution.

Human embryonic stem cell (hESC) therapy has been proposed for regenerative medicine and tissue replacement after injuries or diseases such as Parkinson's disease, spinal cord injury and diabetes mellitus. Although stem cells have the potential of self-renewal, they need extremely high regeneration conditions to maintain their pluripotency.

In view of this, the present disclosure is hereby provided.

SUMMARY OF THE INVENTION

Objects of the present disclosure comprise, for example, providing a venom-based peptide and an application thereof.

The present disclosure is implemented in this way:

in a first aspect, an embodiment of the present disclosure provides a venom-based peptide, and the amino acid sequence of the venom-based peptide is represented by formula 1: $X1$-$X2$-$X3$-$X4$-$X5$-$X6$-$X7$-$X8$-$X9$-$X10$-$X11$-$X12$-$X13$-$X14$-$X15$-$X16$-$X17$-$X18$;

wherein $X1$, $X5$, $X6$, $X9$ and $X11$ are each selected from any one among A, V, L, I, M, F, W and P;

$X2$, $X3$, $X10$, $X15$, $X17$ and $X18$ are each selected from any one among G, C, S, T, Y, N and Q;

$X7$ is selected from D or E;

$X4$, $X8$ and $X16$ are each selected from any one among K, R and H; and $X12$, $X13$ and $X14$ are each selected from any one among K, R, H, D and E.

In a second aspect, an embodiment of the present disclosure provides an application of the venom-based peptide as described in the preceding embodiments for promoting or maintaining self-renewal of a human embryonic stem cell.

In a third aspect, an embodiment of the present disclosure provides a culture medium for culturing a human embryonic stem cell, wherein components of the culture medium comprise the venom-based peptide as described in the preceding embodiments.

In a fourth aspect, an embodiment of the present disclosure provides a formulation for activating TGF and/or FGF signaling pathways, wherein the formulation comprises the venom-based peptide as described in the preceding embodiments.

In a fifth aspect, an embodiment of the present disclosure provides an application of the venom-based peptide as described in the preceding embodiments in the preparation of a formulation for activating TGF and/or FGF signaling pathways.

In a sixth aspect, an embodiment of the present disclosure provides a formulation for promoting the "dimerization" of an FGFR and a TGFβ receptor, wherein the formulation comprises the venom-based peptide as described in the preceding embodiments.

In a seventh aspect, an embodiment of the present disclosure provides an application of the venom-based peptide as described in the preceding embodiments in the preparation of a formulation for promoting the "dimerization" of an FGFR and a TGFβ receptor.

In the eighth aspect, an embodiment of the present disclosure provides a formulation for promoting the expression of a regulatory factor, wherein the formulation comprises the venom-based peptide as described in the preceding embodiments, and the regulatory factor is selected from any one of or a combination of more than one of the followings: OCT4, SOX2 and NANOG.

The present disclosure has the following beneficial effects:

The present disclosure provides a venom-based peptide, and the amino acid sequence of the peptide is represented by formula 1: $X1$-$X2$-$X3$-$X4$-$X5$-$X6$-$X7$-$X8$-$X9$-$X10$-$X11$-$X12$-$X13$-$X14$-$X15$-$X16$-$X17$-$X18$; wherein $X1$, $X5$, $X6$, $X9$ and $X11$ are each selected from any one among A, V, L, I, M, F, W and P; $X2$, $X3$, $X10$, $X15$, $X17$ and $X18$ are each selected from any one among G, C, S, T, Y, N and Q; $X7$ is selected from D or E; $X4$, $X8$ and $X16$ are each selected from any one among K, R and H; and $X12$, $X13$ and $X14$ are each selected from any one among K, R, H, D and E. The peptide has the function of promoting self-renewal of human embryonic stem cells.

BRIEF DESCRIPTION OF THE DRAWINGS

In order to more clearly illustrate the technical solutions of the embodiments of the present disclosure, the drawings used in the examples will be briefly introduced below. It should be understood that the following drawings only show certain examples of the present disclosure, and therefore should not be considered as limiting the scope. For a person skilled in the art, other related drawings also can be obtained according to these drawings without creative efforts.

DETAILED DESCRIPTION OF EMBODIMENTS

In order to make the objects, technical solutions and advantages of examples of the present disclosure clearer, the technical solutions in the examples of the present disclosure will be clearly and completely described below. If specific conditions are not specified in the examples, conventional conditions or conditions recommended by a manufacturer are followed. The reagents or instruments used therein for which manufacturers are not specified are all conventional products that are commercially available.

Abbreviations

Herein, "hESC" is a human embryonic stem cell, and also is called a human ES cell.

Herein, "hPSC" is a human pluripotent stem cell.

Herein, "iPS cell" is an induced pluripotent stem cell.

Herein, "ANOVA" is one-way analysis of variance.

Herein, "qPCR" is a quantitative polymerase chain reaction.

Herein, "CPP" is a cell-penetrating peptide.

Herein, "FGFR" is a fibroblast growth factor receptor.

Herein, "TGFβ" is a transforming growth factor β.

Herein, "X1-X18" all are amino acids. It is known to a person skilled in the art that the abbreviations for amino acids are as follows: G is glycine, A is alanine, V is valine, L is leucine, I is isoleucine, M is methionine, F is phenylalanine, W is tryptophan, P is proline, S is serine, T is threonine, C is cysteine, Y is tyrosine, N is asparagine, Q is glutamine, D is aspartic acid, E is glutamic acid, K is lysine, R is arginine and H is histidine.

Technical Solutions

The advantages of venom-based peptides derived from animals such as scorpions, spiders and snakes are that they have stable structures and have high specificity for target molecules due to more than one million years of adaptive evolution. The research group of the inventor develop a high-throughput screening platform, and identify a venom peptide named Gonearrestide (18AA, MW2194, also known as P13) from an in-house scorpion venom library. However, the relationship between venom-based peptides and receptors involved in the self-renewal or differentiation of stem cells has rarely been reported.

An embodiment of the present disclosure firstly provides a venom-based peptide, and the amino acid sequence of the peptide is represented by formula 1: X1-X2-X3-X4-X5-X6-X7-X8-X9-X10-X11-X12-X13-X14-X15-X16-X17-X18;

wherein X1, X5, X6, X9 and X11 are each independently selected from any one of the group consisting of A, V, L, I, M, F, W and P;

X2, X3, X10, X15, X17 and X18 are each independently selected from any one of the group consisting of G, C, S, T, Y, N and Q;

X7 is selected from D or E; X4, X8 and X16 are each independently selected from any one of the group consisting of K, R and H; and X12, X13 and X14 are each independently selected from any one of the group consisting of K, R, H, D and E.

In one or more embodiments, X1 is W.
In one or more embodiments, X2 is C.
In one or more embodiments, X3 is Y.
In one or more embodiments, X4 is K.
In one or more embodiments, X5 is L.
In one or more embodiments, X6 is P.
In one or more embodiments, X7 is D.
In one or more embodiments, X8 is R.
In one or more embodiments, X9 is V.
In one or more embodiments, X10 is S.
In one or more embodiments, X11 is I.
In one or more embodiments, X15 is G.
In one or more embodiments, X17 is C.
In one or more embodiments, X18 is N.

It should be noted that when X1 is W, X2 is C, X3 is Y, X4 is K, X5 is L, X6 is P, X7 is D, X8 is R, X9 is V, X10 is S, X11 is I, X15 is G, X17 is C; and X18 is N, the sequence represented by formula 1 is: WCYKLPDRVSI-X12-X13-X14-X15 G-X16-CN.

In one or more embodiments, X12 is K or E.
In one or more embodiments, X13 is R or E.
In one or more embodiments, X14 is R or K.
In one or more embodiments, X16 is R or K.

According to the research of the applicant, it is found that a polypeptide with the sequence represented by formula 1 has the technical effect of effectively promoting the self-renewal of a human embryonic stem cell.

In one or more embodiments, the amino acid sequence of the peptide is represented by SEQ ID NO. 1 or 2.

In one or more embodiments, the amino acid sequence of the peptide is represented by SEQ ID NO. 2.

It should be noted that, herein, the polypeptide with the sequence represented by SEQ ID NO. 1 is called P13, and the polypeptide with the sequence represented by SEQ ID NO. 2 is called M6.

An embodiment of the present disclosure also provides an application of the venom-based peptide as described in any preceding embodiment for promoting or maintaining self-renewal of a human embryonic stem cell.

Human embryonic stem cell (hESC) therapy has been proposed for regenerative medicine and tissue replacement after injuries or diseases such as Parkinson's disease, spinal cord injury and diabetes mellitus. Although stem cells have the great potential of self-renewal, they need extremely high regeneration conditions to maintain their pluripotency in vitro. mTeSR™1 and a basal 8TM culture medium (E8) are main products on the market for the growth and proliferation of human pluripotent stem cells (hPSCs), ES cells and iPS cells. The E8 culture medium is a culture medium free of exogenous substances and feeder layers, and has the following eight components: DMEM/F12, FGF2, TGFβ1, insulin, L-ascorbic acid, selenium, NaHCO$_3$ and transferrin. A basal 6TM culture medium (E6) is a culture medium which is based on the E8 culture medium but is free of the two components FGF2 and TGFβ1, and supports somatic cell reprogramming and hPSC differentiation.

On the basis of the polypeptides discovered, an embodiment of the present disclosure also provides a culture medium for culturing a human embryonic stem cell, wherein components of the culture medium comprise the venom-based peptide as described in any preceding embodiment.

It should be noted that there is no specific limitation to the components of the culture medium, as long as the culture medium can be used for culturing human embryonic stem cells. All culture media containing the venom-based peptide as described in any preceding embodiment fall within the scope of protection of the present application.

In some embodiments, the venom-based peptide in the culture medium has a concentration of 50-200 μM.

In one or more embodiments, typical but non-limiting examples of the concentration of the peptide in the culture medium may be, for example, 50 μM, 55 μM, 60 μM, 65 μM, 70 μM, 75 μM, 80 μM, 85 μM, 90 μM, 95 μM, 100 μM, 105 μM, 110 μM, 115 μM, 120 μM, 125 μM, 130 μM, 135 μM, 140 μM, 145 μM, 150 μM, 155 μM, 160 μM, 165 μM, 170 μM, 175 μM, 180 μM, 185 μM, 190 μM, 195 μM or 200 μM.

In some embodiments, the culture medium further comprises at least one of or a combination of more than one of the following components: DMEM/F12, FGF2, TGFβ1, insulin, L-ascorbic acid, selenium, NaHCO$_3$ and transferrin.

In one or more embodiments, the components of the culture medium are P13 and/or M6 added on the basis of the basal culture medium, wherein the basal culture medium is E6 or E6+TGFβ or E6+FGF2.

An embodiment of the present disclosure provides a formulation for activating TGF and/or FGF signaling pathways, wherein the formulation comprises the venom-based peptide as described in any preceding embodiment.

In one or more embodiments, the FGF signaling pathway refers to Erk1/2 signaling stimulated by FGF; and
the TGF signaling pathway refers to SMAD2/3 signaling stimulated by TGFβ.

An embodiment of the present disclosure also provides an application of the venom-based peptide as described in any preceding embodiment in the preparation of a formulation for activating TGF and/or FGF signaling pathways.

In one or more embodiments, the FGF signaling pathway refers to Erk1/2 signaling stimulated by FGF; and the TGF signaling pathway refers to SMAD2/3 signaling stimulated by TGFβ.

An embodiment of the present disclosure also provides a formulation for promoting the "dimerization" of an FGFR and a TGFβ receptor, wherein the formulation comprises the venom-based peptide as described in any preceding embodiment.

An embodiment of the present disclosure also provides an application of the venom-based peptide as described in any preceding embodiment in the preparation of a formulation for promoting the "dimerization" of an FGFR and a TGFβ receptor.

In addition, an embodiment of the present disclosure also provides a formulation for promoting the expression of a regulatory factor, wherein the formulation comprises the venom-based peptide as described in the preceding embodiment, and the regulatory factor is selected from any one of or a combination of more than one of the followings: OCT4, SOX2 and NANOG.

The characteristics and performance of the present disclosure will be further described in detail below in combination with the examples.

Example 1

This example provided a venom-based peptide P13 and a mutant M6 of the P13.

The amino acid sequence of the P13 was represented by SEQ ID NO. 1, and the amino acid sequence of the M6 was represented by SEQ ID NO. 2.

Mutation of P13 to M6:

The P13 was mutated to synthesize a derivative P13-M5 (the amino acid sequence was represented by SEQ ID NO. 3) thereof. As reported in the literature, the heparin-binding affinity of basic amino acid arginine was 2.5 times that of lysine, so P13-M6 was obtained by further mutation.

Example 2

This example provided culture media for culturing human embryonic stem cells, and the culture media were specifically as follows:
(1) E6 and P13;
(2) E6 and M6;
(3) E8 and P13; and
(4) E8 and M6.

It should be noted that in (1)-(4), the P13 and the M6 each had a concentration of 100 μM. Specifically, the E6 culture medium comprised the following components: DMEM/F12, insulin, L-ascorbic acid, selenium, NaHCO$_3$ and transferrin; and the E8 culture medium comprised the following components: DMEM/F12, FGF2, TGFβ1, insulin, L-ascorbic acid, selenium, NaHCO$_3$ and transferrin.

Culture of Human ES Cells

By taking the E8 culture medium as an example, human ES cells (hESC, H1) were kept in the E8 culture medium by using a tissue culture plate coated with matrix gel. The E8 culture medium had the following eight components: DMEM/F12, L-ascorbic acid-2-magnesium phosphate (64 mg/L), sodium selenide (14 μg/L), insulin (19.4 mg/L), NaHCO$_3$ (543 mg/L), transferrin (10.7 mg/L), and FGF2 (100 μg/L) and TGFβ1 (2 μg/L) growth factors.

Once the cells reached 80%-85% confluency, the cells were passaged every 3-4 days in the presence of Y-27632 by using the EDTA method as previously described. The E8 culture medium had to be changed every day. hESCs with normal karyotypes were used when the passage number was less than P50.

Experimental Example 1

A. Proliferation of Human ES Cells Treated with P13 Provided in Example 1

2 experimental groups were set. In group 1, human ES cells were cultured in an E8 culture medium with the venom-based peptide P13 (with a final concentration of 200 μM). In group 2, human ES cells were cultured in an E8 culture medium. The human ES cells were dissociated with TrypLE (Gibco) at room temperature for 5-8 min after growing in a 48-well culture dish for 24 h, and neutralized with a culture medium containing 0.5% BSA. The number of the cells was determined by using a BD Accuri C6 flow cytometry and normalized to the number of original cells that were plated.

Figure 1:
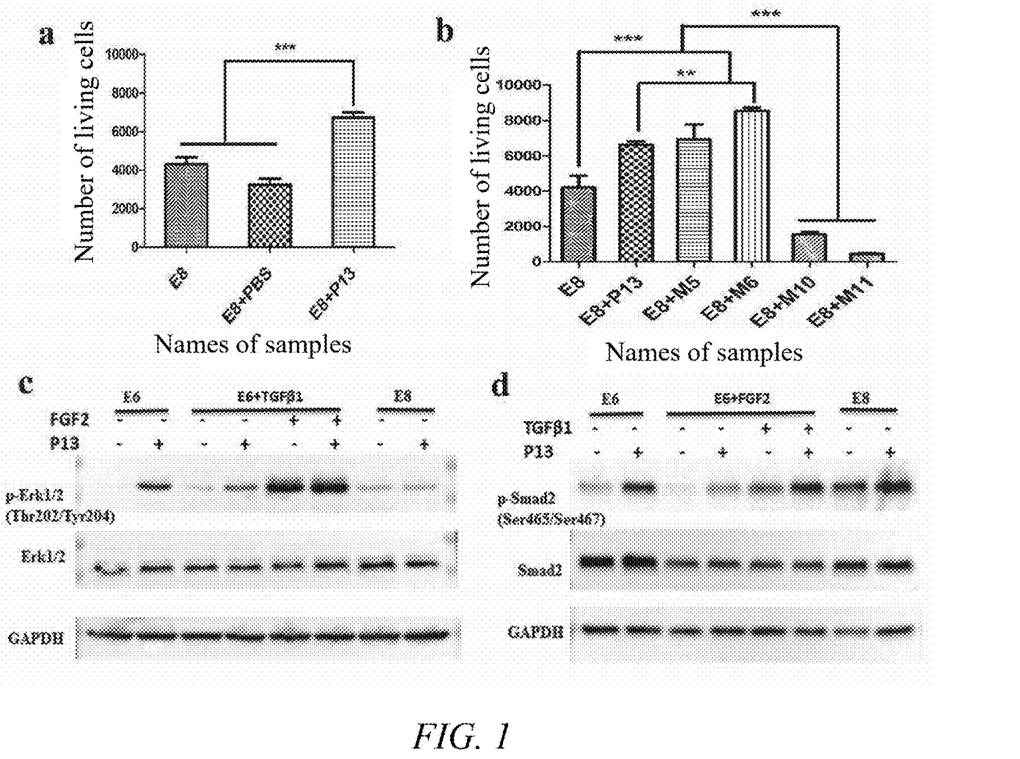
FIG. 1 shows verification results of the survival abilities of and p-Erk1/2 and p-Smad2 expressions in human ES cells treated with the peptide in experimental example 1 of the present disclosure.

By using the one-way analysis of variance (ANOVA), it was found that the number of the human ES cells that survived in the E8 culture medium with P13 was significantly higher than the number of the human ES cells that survived in the E8 culture medium. Please refer to FIG. 1a for the result that P13 promoted the proliferation of the human ES cells.

B. Determination of Survival of P13 and Mutants Thereof

A method for determining the survival of P13 was also used to screen mutants (M5, M6, M10 and M11) thereof.

Among them, the mutant M5 was the mutant P13-M5 (K12E/E13K) obtained by exchanging the amino acids at positions 12 and 13 on the basis of P13, and the amino acid sequence of the mutant M5 was represented by SEQ ID NO. 3.

The mutant P13-M6 (K12E/E13R/K14R) was obtained when lysine at positions 13 and 14 in the M5 was substituted with arginine, and the amino acid sequence of the mutant M6 was represented by SEQ ID NO. 2.

By using the M6 as a template, two key amino acids (cysteine and aspartic acid at the N-terminal of P13) were also mutated to obtain the two mutants M10 and M11. The amino acid sequence of the mutant M10 was represented by SEQ ID NO. 4, and the amino acid sequence of the mutant M11 was represented by SEQ ID NO. 5. Refer to Table 1 for details.

TABLE 1

Sequence information of P13 and mutants thereof

| | 5'-3' | SEQ ID NO. | MW (Da) |
|---|---|---|---|
| P13 | W C Y K L P D R V S I K E K G R C N | 1 | 2194.6 |
| M6 | W C Y K L P D R V S I E R R G R C N | 2 | 2250.6 |
| M5 | W C Y K L P D R V S I E K K G R C N | 3 | 2194.6 |
| M10 | W R Y K L P D R V S I E R R G R C N | 4 | 2303.7 |
| M11 | W R Y K L P K R V S I E R R G R C N | 5 | 2316.7 |

Please refer to FIG. 1B for the determination results.

It can be seen from FIG. 1B that the number of survival human ES cells in the E8+M5 culture medium showed a slight increase but no significant difference from the number of the cells in the E8+P13 medium.

The one-way ANOVA showed that the number of survival human ES cells in the E8+M6 culture medium was significantly higher than that in E8+P13 culture medium.

In addition, the number of survival human ES cells in the E8+M10/M11 culture medium was significantly lower than that in the E8 culture medium. Primary structures and molecular weights of the P13 and the mutants thereof were listed in Table 1.

C. Activation of p-Erk1/2 and p-Smad2 in Human ES Cells Treated with P13

Verification of p-Erk1/2 Expression

Human ES cells were cultured under three different culture conditions (E6, E6+TGFβ1 and E8) and these conditions treated with P13 to observe the difference of p-Erk1/2 expressions. Please refer to FIG. 1c for the results.

As shown in FIG. 1c, it was observed that the expression level of p-Erk1/2 was significantly up-regulated in the E6 culture medium stimulated by P13 in comparison with the E6 control culture medium. The expression level of p-Erk1/2 was up-regulated in the E6 culture medium with P13 and/or FGF2 in comparison with human ES cells in the E6+TGFβ1 culture medium.

The expression level of p-Erk1/2 was not significantly up-regulated in the E8 culture medium with P13 in comparison with human ES cells in the E8 culture medium.

Verification of p-Smad2 expression

Human ES cells were cultured under three different culture conditions (E6, E6+FGF2 and E8) and these conditions treated with P13 to observe the difference of p-Smad2 expressions. Please refer to FIG. 1d for the results.

As shown in FIG. 1d, it was observed that the expression level of p-Smad2 was significantly up-regulated in the E6 culture medium stimulated by P13 in comparison with the E6 control culture medium. The expression level of p-Smad2 was up-regulated in the E6 culture medium with P13 and/or TGFβ1 in comparison with human ES cells in the E6+FGF2 culture medium.

The expression level of p-Smad2 was up-regulated in the E8 culture medium with P13 in comparison with human ES cells in the E8 culture medium.

Experimental Example 2

The effect of P13 on the self-renewal abilities of human ES cells was verified. Please refer to FIG. 2 for the results.

Two groups were prepared, with four different culture media (E6, E6+TGFβ1, E6+FGF2 and E8) in each group, and the peptide P13 was added to the 4 culture media in group 1. A total of eight different culture media were prepared.

Figure 2:
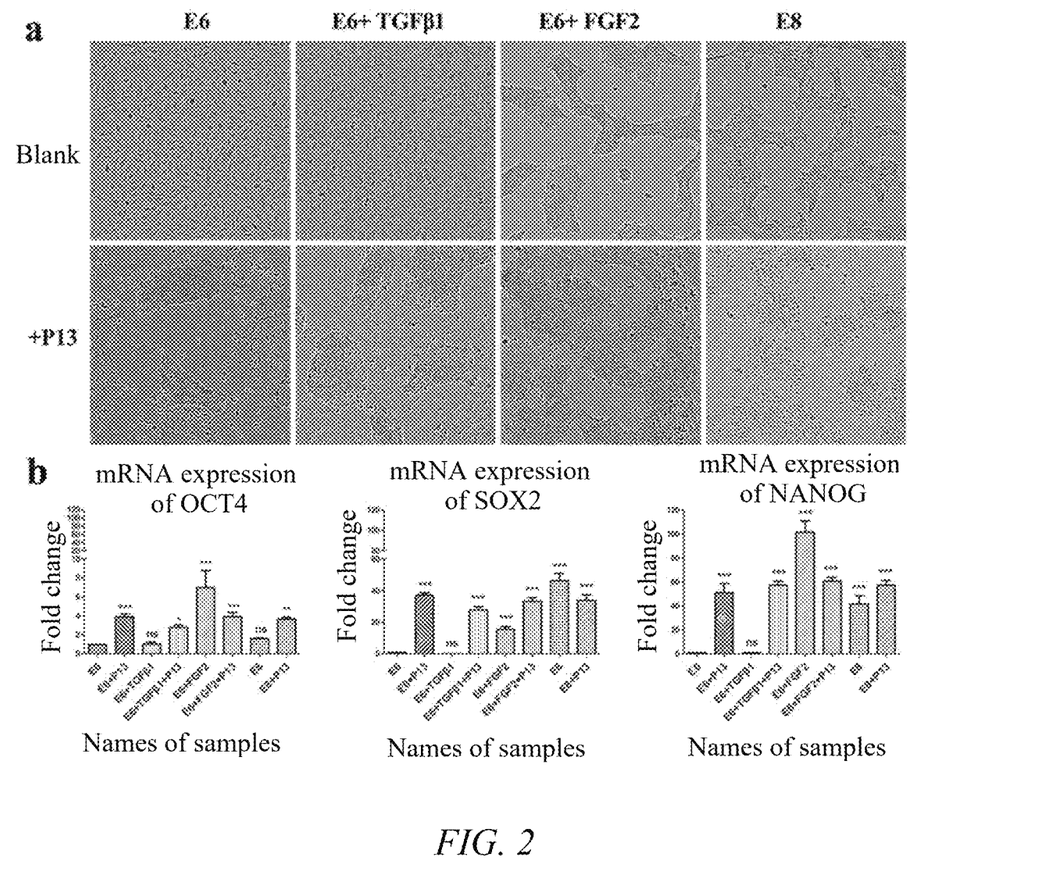
FIG. 2 shows verification result diagrams of the survival abilities of and p-Erk1/2 and p-Smad2 expressions in human ES cells treated with the peptide in experimental example 2 of the present disclosure.

The human ES cells were serially passaged five times under eight different conditions to detect the differences of morphologies and pluripotency markers. Please refer to FIG. 2a for the morphological difference results observed after five passages.

As can be seen from FIG. 2a, the colony-forming characteristics of the human ES cells disappeared in the E6 and E6+TGFβ1 culture media. However, the human ES cells still maintained their colony morphologies under the E6+P13 and E6+TGFβ+P13 conditions after five passages. The human ES cells formed a mixed state of colonies and dispersed cells in the E6+P13 culture medium. Then, when P13 was added to the E6+FGF2 and E8 culture media, respectively, the human ES cells showed no significant morphological differences after continuous culture for five generations.

The self-renewal markers of the human ES cells were detected by using a quantitative polymerase chain reaction (qPCR) method.

The differential expressions of mRNAs of OCT4, SOX2 and NANOG were detected under the culture conditions of the above eight different culture media. Please refer to FIG. 2b for the detection results.

As can be seen from the results, the OCT4, the SOX2 and the NANOG maintained low mRNA expression levels in the E6 and the E6+TGFβ1 in comparison with other conditions, which was consistent with morphological results observed in FIG. 2a.

The OCT4, SOX2 and NANOG in the human ES cells were up-regulated under other six conditions in comparison with the E6 and E6+TGFβ1 culture media. The one-way ANOVA (***$p<0.001$) showed that the mRNA expression of the NANOG was significantly up-regulated in comparison with the E6 culture medium.

Experimental Example 3

The effect of M6 on the self-renewal abilities of human ES cells was verified. Please refer to FIG. 3 for the experimental results.

On the basis of the preliminary results, three groups were prepared, with four different culture media (E6, E6+TGFβ1, E6+FGF2 and E8) in each group, the peptide M6 was added to the four culture media in group 1, respectively, and the P13 was added in another group as the control. In this way, a total of twelve different culture media were prepared.

Figure 3:
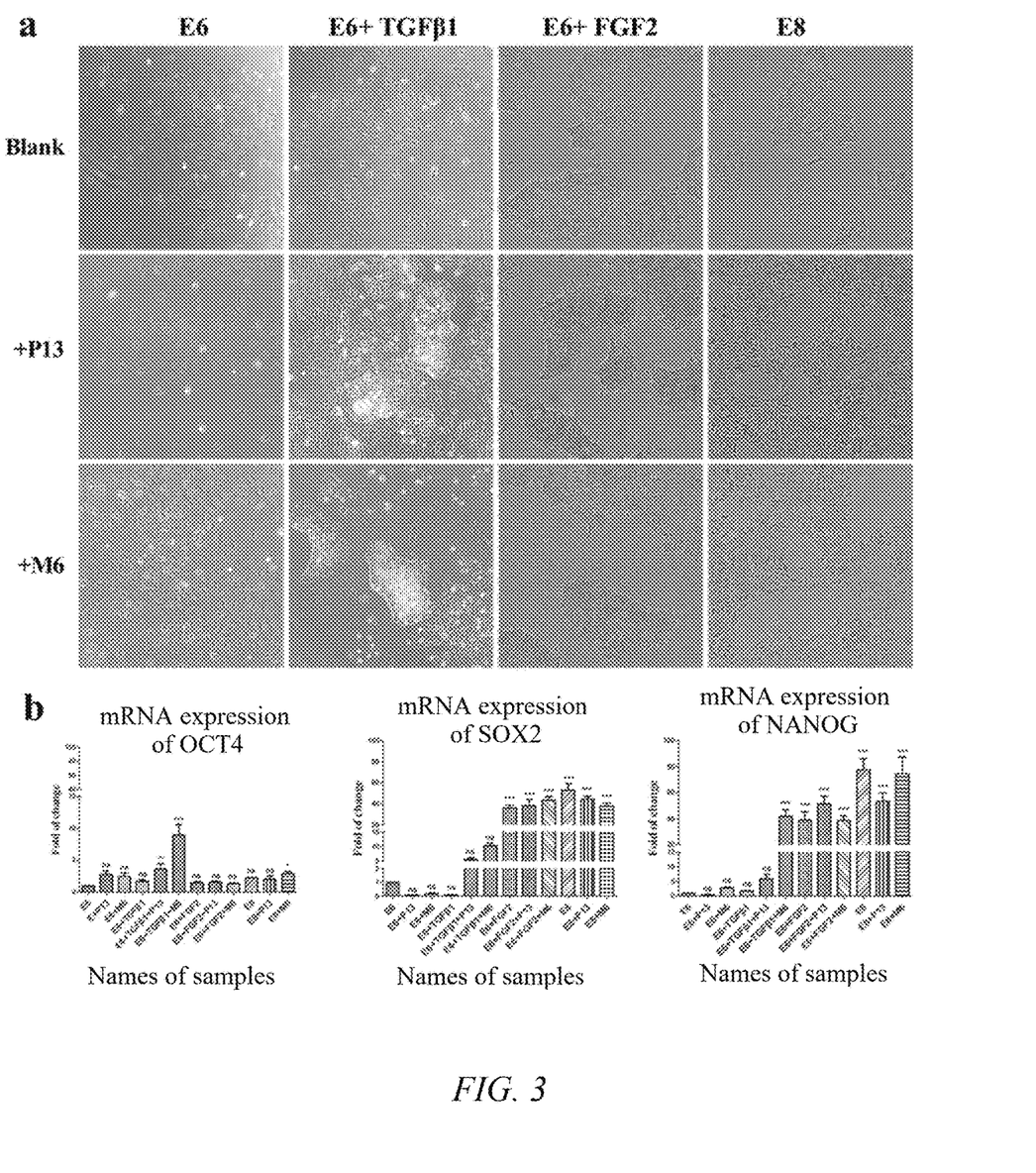
FIG. 3 shows analysis and verification result diagrams of the morphologies and self-renewal abilities of human ES cells treated with M6 in experimental example 3 of the present disclosure.

The human ES cells were serially passaged five times under 12 different conditions to detect the differences of morphologies and pluripotency markers. Please refer to FIG. 3a for the morphological difference results obtained after five passages (in the figure, the samples from left to right were E6, E6+P13, E6+TGFβ1, E6+TGFβ1+P13, E6+FGF2, E6+FGF2+P13, E8 and E8+P13).

As can be seen from FIG. 3a, the colony-forming characteristics of the human ES cells completely disappeared in the E6, E6+P13, E6+M6 and E6+TGFβ culture media. However, the human ES cells maintained their colony-forming morphologies after five passages under the E6+TGFβ+P13 and E6+TGFβ+M6 conditions in comparison with the E6+TGFβ culture medium. The human ES cells showed a mixed state of colonies and dispersed cells under the conditions of the E6+TGFβ+P13 and E6+TGFβ+M6 culture media. Then, P13 and M6 were added to the E6+FGF2 and E8 culture media, respectively, and the human ES cells showed no significant difference in their morphologies after continuous culture for five generations.

The self-renewal markers of the human ES cells were detected by using qPCR assay.

The differential expressions of mRNAs of OCT4, SOX2 and NANOG were detected under 12 different conditions. Please refer to FIG. 3b for the detection results (in the figure, the samples from left to right were E6, E6+P13, E6+M6, E6+TGFβ1, E6+TGFβ1+P13, E6+TGFβ1+M6, E6+FGF2, E6+FGF2+P13, E6+FGF2+M6, E8, E8+P13 and E8+M6).

The OCT4, the SOX2 and the NANOG maintained low mRNA expression levels in the E6, the E6+P13, the E6+M6 and the E6+TGFβ1 in comparison with other conditions, which was consistent with morphological results observed in FIG. 3a above. The OCT4, SOX2 and NANOG of the human ES cells were up-regulated under the E6+TGFβ1+P13 and E6+TGFβ1+M6 conditions in comparison with the E6+TGFβ1 culture medium. The one-way ANOVA showed that the expression levels of SOX2 and NANOG were significantly up-regulated in the E6+FGF2, E6+FGF2+P13, E6+FGF2+M6, E8+P13 and E8+M6 culture media in comparison with the E6 culture medium (***$p<0.001$).

Experimental Example 4

The cell-penetrating abilities of P13 and M6 in human ES cells were verified. Please refer to FIG. 4 for the results.

Some polypeptides may act as cell-penetrating peptides (CPPs) that can penetrate cell membranes to perform their functions or serve as carriers to transport certain molecules into cells. The object of this experimental example was to determine whether P13 and M6 can enter cells to perform their respective functions.

The human ES cells were treated with FITC-labeled P13 and M6 for 24 h, respectively, and the positions of the peptides were confirmed under a confocal microscope by immunostaining with nuclear dye combined with cytoplasmic membrane dye.

Immunostaining of human ES cells treated with the fluorescently labeled P13/M6: Human ES cells were cultured on a sterile cover slide, and a 12-well plate was coated with matrix gel at a concentration of 1 mg/ml for 1-2 h. After 24 h, the cells were washed with a DMEM-F12 culture medium, the E8 culture medium was used for replacement, and the cells were treated with the fluorescently labeled peptide for 24 h. Then, the cell membranes were stained by using the CellMask™ crimson plasma membrane (Thermo Fisher), and incubation was performed at 37° C. for 10 min. The staining solution was removed, 200 μL of 4.0% formaldehyde was added to the culture medium, and incubation was performed at 37° C. for 10 min. The culture medium was then removed. The cells were washed with 1×PBS three times and incubated with 10 μl of DAPI (a DNA staining agent) and a mounting medium for one minute, and the cover slide was mounted and sealed with nail polish to prevent drying. The samples were imaged with a Carl Zeiss confocal LSM710 microscope.

Figure 4:
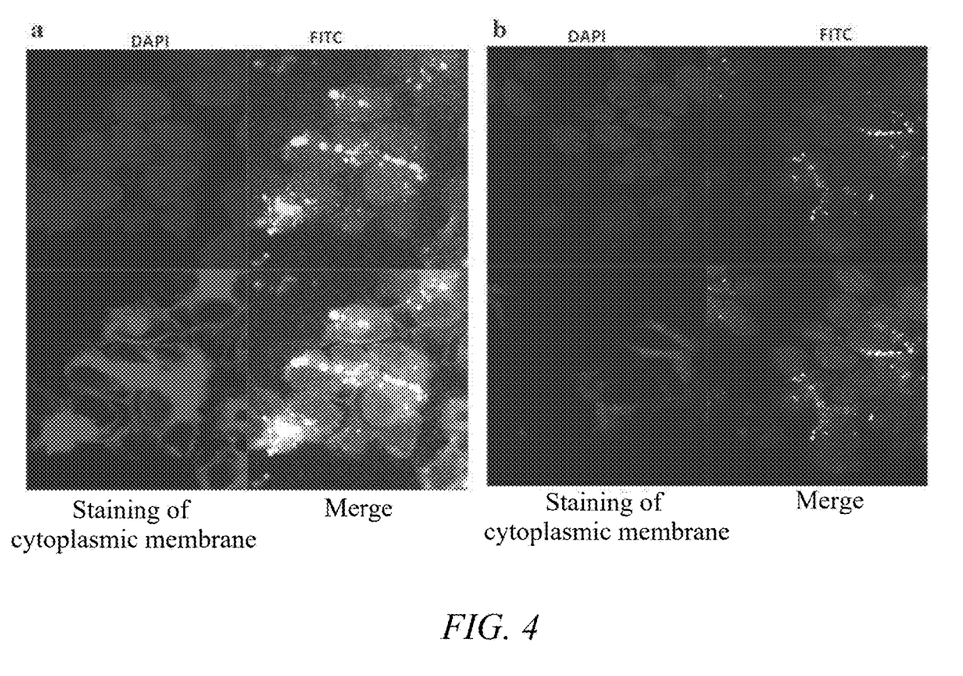
FIG. 4 shows acting position result diagrams of FITC-labeled P13 and M6 thereof in the membranes of human ES cells in experimental example 4 of the present disclosure.

As can be seen from the results as shown in FIG. 4 (FIG. 4a was P13-FITC, and FIG. 4b was M6-FITC), blue fluorescence represented the nuclei of the embryonic stem cells, red fluorescence represented the cell membranes, green fluorescence-labeled P13 and M6 bound to the plasma membranes, and no green fluorescence-labeled P13 and M6 were found in the cytoplasm. This indicated that P13 and M6 did not belong to the CPP family.

Experimental Example 5

A. Verification of p-Erk1/2 and p-Smad2 Expressions in Human ES Cells Treated with Mutant M6

Firstly, the differences of the p-Erk1/2 and p-Smad2 expressions in human ES cells stimulated by P13 and M6 were compared.

Figure 5:
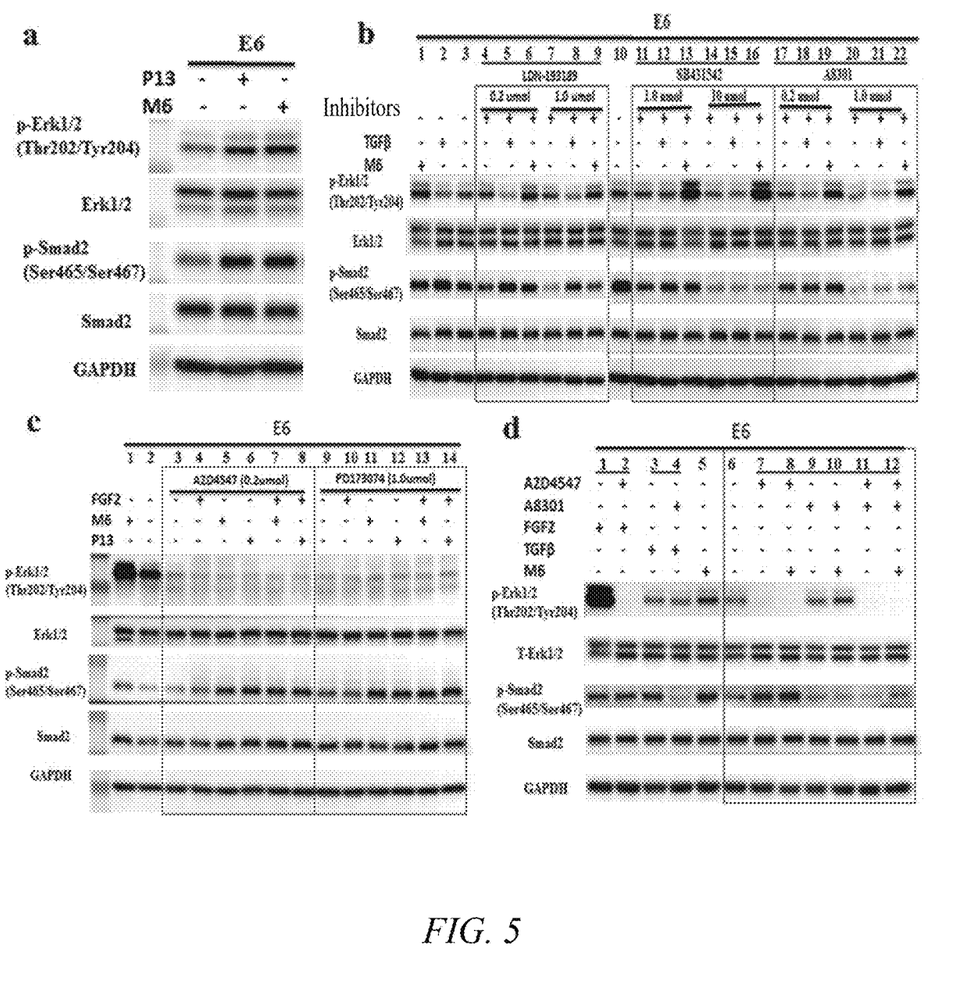
FIG. 5 shows verification diagrams of the p-Erk1/2 and p-Smad2 expressions in human ES cells treated with mutant M6 in experimental example 5 of the present disclosure.

Please refer to FIG. 5a (please refer to FIG. 5 for the results of experimental example 5) for the results. It was found that the expression levels of p-Erk1/2 and p-Smad2 were significantly up-regulated in the E6 culture media with P13 and M6 in comparison with the human ES cells in the E6 culture medium. The expression levels of p-Erk1/2 and p-Smad2 were not significantly up-regulated in the E6 culture medium with M6 in comparison with human ES cells in the E6 culture medium with P13.

B. Verification of p-Erk1/2 and p-Smad2 Expressions in Human ES Cells Treated with Mutant M6 in the Presence of Small-Molecule Inhibitors A method for detecting the p-Erk1/2 and p-Smad2 expressions in human ES cells treated with small-molecule inhibitors: Human ES cells (H1) were seeded into a 12-well plate with an E8 culture medium. After 24 h, the culture medium was changed to the E6. The human ES cells were incubated at 5% $CO_2$ and 37° C. for 20-24 h, peptides P13 and/or M6 were added, and the cells were harvested by using RIPA buffer 1 h later.

Human ES cells (H1) were seeded into a 12-well plate with an E8 culture medium. After 24 h, the culture medium was changed to the E6. The human ES cells were incubated at 5% $CO_2$ and 37° C. for 20-24 h, FGFR inhibitors AZD4547 and PD173074 and TGFβ receptor inhibitors LDN193189, SB431542 and A8301 at certain concentrations were added according to the layout, and incubation was performed for three hours; Then, peptides P13 and M6 at certain concentrations were added, and the cells were harvested by using RIPA buffer 1 h later. Then, the p-Erk1/2 and p-Smad2 expressions were detected by Western blot.

Western blot: for the Western blot of soluble proteins, human ES cells were harvested by using RIPA buffer with a nuclease (benzonase), a protease inhibitor and a phosphatase inhibitor. The concentrations of the proteins were measured by using a Pierce™ BCA protein assay kit (Thermo Fisher). 12% SDS-PAGE gel was used, and the proteins in the gel were transferred onto a nitrocellulose membrane. The membrane was blocked under shaking by using 5% skimmed milk in 1×PBST buffer at room temperature for one hour, and incubated with a primary antibody (rabbit monoclonal phosphate-p44/42 MAPK (Erk1/2) (Thr202/Tyr204): Cell Signaling Technology (CST) 4370S; rabbit p44/42 MAPK (Erk1/2): CST 9102S; rabbit monoclonal phosphate-Smad2 (Ser465/467) (138D4): CST 3108S; rabbit Smad2 (D43B4) XP: CST 5339S; Rat GAPDH: Proteintech 60004-1-Ig) overnight at 4° C. and then with a secondary antibody HRP for one hour. The PVDF membrane was washed with 1×PBST three times, 10 min each time, at the end of each incubation step with antibodies. Chemiluminescence was detected by using a Pierce™ ECL Western blot substrate on a ChemiDoc imaging system (Bio-Rad).

B-1. Study on the Expression Levels of p-Erk1/2 and p-Smad2 in Human ES Cells Treated with TGFβ Family Receptor Inhibitors LDN189193, SB431542 and A8301.

LDN193189 had the ability to inhibit ALK1 (ACVRL1), ALK2 (ACVR1A), ALK3 (BMPR1A) and ALK6 (BMPR1B) ($IC_{50}$=0.8 nM, 0.8 nM, 5.3 nM and 16.7 nM respectively), and was a potent inhibitor of a bone morphogenetic protein (BMP) pathway.

SB431542 inhibited ALK4 (ACVR1B) and ALK5 (TGFβR1) ($IC_{50}$=140 nM and 94 nM respectively), and was a selective potent inhibitor of a TGF-β/Activin/NODA pathway.

A8301 was a selective inhibitor of a type I activin/nodal receptor ALK4, a TGFβ type I receptor ALK5 kinase and a type I nodal receptor ALK7 (ACVR1C) ($IC_{50}$=45 nM, 12 nM and 7.5 nM respectively).

The results were as shown in FIG. 5b. As can be seen from lanes 3-9 in FIG. 5b, 1.0 µmol of LDN189193 can inhibit the p-Smad2 expression and 0.2 µmol of LDN189193 cannot inhibit the p-Smad2 expression in comparison with the E6 control culture medium (lane 3); However, the p-Smad2 expression was up-regulated in each E6 culture medium treated with TGFβ and M6 in comparison with the stem cells in the E6 culture medium with 1.0 µmol of LDN189193.

Lanes 11-16 (SB431542) and 17-22 (A8301) showed that 1.0 µmol of SB431542 and 0.2 µmol of A8301 cannot inhibit the p-Smad2 expression. However, SB431542 (10 µmol) and A8301 (1.0 µmol) at high concentrations can significantly inhibit the p-Smad2 expression; and the p-Erk1/2 expression was up-regulated in the E6 culture medium with M6, but the up-regulated p-Erk1/2 expression was not observed in the E6 culture medium with TGFβ.

B-2. Observation on the Expression Levels of p-Erk1/2 and p-Smad2 in Human ES Cells Treated with FGF Family Receptor Inhibitors AZD4547 and PD173074.

AZD454724 was a potent FGFR1/2/3 inhibitor ($IC_{50}$=0.2 nM, 2.5 nM and 1.8 nM respectively) with weak activity on FGFR4. Docetaxel (AZD4547) had entered a phase II/III trial to treat patients with stage IV squamous cell lung cancer.

PD173074 was a potent FGFR1 inhibitor ($IC_{50}$=25 nM) in cell-free assays.

The results were as shown in FIG. 5c.

As shown by lanes 2-8 in FIG. 5c, 0.2 µmol of AZD4547 can inhibit the p-Erk1/2 expression in comparison with the control E6 culture medium (lane 2) and the E6 culture media treated with P13, M6 and/or FGF2. However, the p-Smad2 expression was up-regulated in the E6 culture media treated with P13, P13+FGF2, M6 and M6+FGF2 in comparison with the control E6 culture medium and the E6 culture medium with 0.2 µmol of AZD4547.

As shown by lanes 9-14 in FIG. 5c, 1.0 µmol of PD173074 can inhibit the p-Erk1/2 expression in comparison with the control E6 culture medium and the E6 culture media with P13, M6 and/or FGF2. However, the p-Smad2 expression was up-regulated in the E6 culture media with P13, P13+FGF2, M6 and M6+FGF2 in comparison with the control E6 culture medium and the E6 culture medium with 1.0 µmol of PD173074.

B-3. Study on the p-Erk1/2 and p-Smad2 Expressions in Human ES Cells Treated with an FGF Receptor Inhibitor AZD4547 (0.2 µmol) and/or a TGFβ Receptor Inhibitor A8301 (1.0 µmol).

The results were as shown in FIG. 5d. The functions of FGF2 and a FGF receptor inhibitor AZD4547 were verified by lanes 1-2 in the figure; the FGF2 up-regulated the p-Erk1/2 expression, and the AZD4547 inhibited the p-Erk1/2 expression, even in the E6 culture medium with FGF2.

The functions of TGFβ1 and a TGFβ receptor inhibitor A8301 were verified by lanes 3-4; the TGFβ1 up-regulated the p-Smad2 expression, but A8301 also inhibited the p-Smad2 expression, even in the E6 culture medium with TGFβ1.

The differences of the p-Erk1/2 and p-Smad2 expressions in the human ES cells treated with M6 in the presence of the single inhibitor and the double inhibitors (FGF and TGFβ) were verified by lanes 7-10; lanes 7-8 showed that 0.2 µmol of AZD4547 also inhibited the p-Erk1/2 expression even in the E6 culture medium with M6, and lanes 9-10 showed that 1.0 µmol of A8301 also inhibited the p-Smad2 expression even in the E6 medium with M6.

Lanes 11-12 showed that the p-Erk1/2 and p-Smad2 expressions were inhibited by the double inhibitors 0.2 µmol of AZD4547 and 1.0 µmol of A8301 even in the E6 culture medium with M6.

Experimental Example 6

Figure 6:
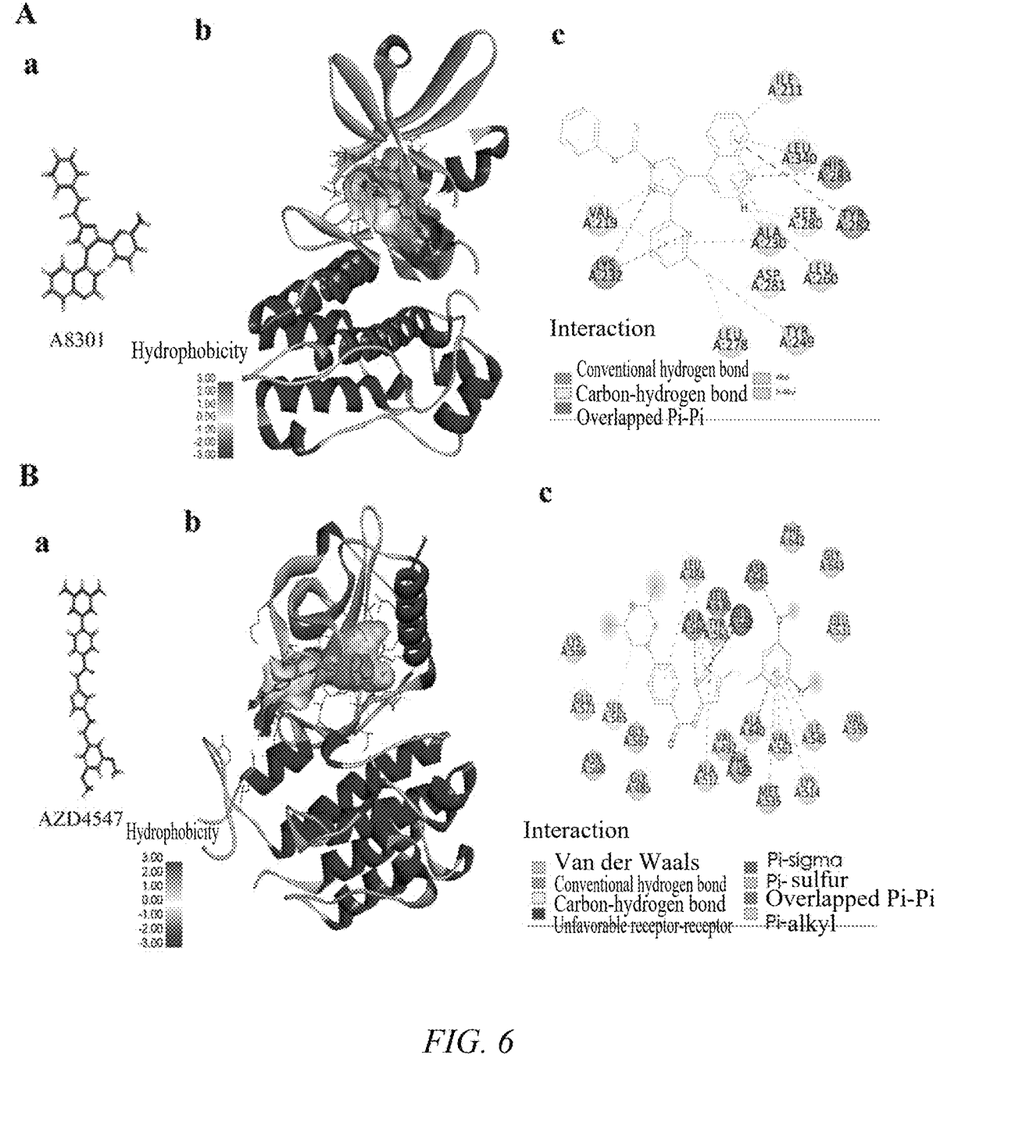
FIG. 6 shows molecular model diagrams of docking of small-molecule inhibitors in experimental example 6 of the present disclosure.

Please refer to FIG. 6 for molecular modeling of small-molecule inhibitors.

PDB ID 3TZM Represented an Intracellular Kinase Domain of TGFβ Receptor Type 1.

The 3TZM was actually a three-dimensional crystal structure, which comprises a small-molecule inhibitor SB431542 and a TGFβ receptor. CDOCKER was used to delete SB431542 and dock A8301 into the intracellular kinase domain of FGFR. The small-molecule inhibitor A8301 bound to a binding pocket of the intracellular kinase domain of the TGFβ receptor type 1. Please refer to FIG. 6A.

It should be noted that CDOCKER was a CHARMM-based molecular dynamic (MD) scheme where a ligand was docked into a receptor binding site by using high-temperature dynamics to find a flexible conformational space of a ligand molecule and stimulate annealing so as to map each conformation at the active receptor site. The TGFβ receptor type 1 (PDB ID: 3TZM) was selected as a receptor, the small-molecule inhibitor contained in the crystal structure was removed, and a site sphere was selected from PDB site records. Then, A8301 was selected as a ligand. The parameters were set as follows: 1000 random conformation dynamic steps, and 1000 k dynamic target temperature; 2000 simulated annealing heating steps, 700 k heating target temperature, 5000 cooling steps and 300 k cooling target temperature; and force field: CHARMM50. Discovery Studio v17.2.0 commercial software was used.

FIG. 6A-a showed a 2D structure of A8301; FIG. 6A-b showed A8301 binding to the pocket of the intracellular kinase domain of the TGFβ receptor; and FIG. 6A-c showed a 2D model of the interaction between A8301 and TGFβ in an active molecular window, wherein the amino acids of the receptor and the ligand that were interacted were marked. The small-molecule inhibitor bound to the kinase domain of the receptor, which effectively inhibited the phosphorylation of downstream molecules.

PDB ID 4WUN Represented an Intracellular Kinase Domain of FGFR1.

Please refer to FIG. 6B for solid ribbon modeling of a small-molecule inhibitor AZD4547 binding to the intracellular kinase domain of FGFR.

FIG. 6B-a showed a 2D structure of AZD4547; FIG. 6B-b showed AZD4547 binding to a pocket of the intracellular kinase domain of FGFR; and FIG. 6B-c showed a 2D model of the interaction between AZD4547 and FGFR in an active molecular window, wherein the amino acids of the receptor and the ligand that were interacted were marked.

Experimental Example 7

A. Study on the Effects of P13 and M6 on the Structures and Dynamics of FGFR Dimers by Using Molecular Dynamics (MD) Simulations.

PDB entry 1FQ9 (with a resolution of 3 Å) was used as a starting structure for a receptor, a ligand thereof and a cofactor. The PDB contained two FGFs, two FGFRs and two heparan sulfate (HS) molecules that bind in a stable ternary complex. On the other hand, starting coordinates of peptides P13 and M6 were obtained by prediction using a PEPFOLD3 server. The C-terminals of the two peptides were amidated according to the experimental forms. Simulation systems with four different settings were constructed: a crystal 2:2:2 FGF:FGFR:HS complex, an apolipoprotein 2:2 FGFR:HS complex and a 2:2 FGFR:HS complex binding to chains of the P13 or M6.

The peptide with twenty chains was added to a solvent phase of the system and allowed to equilibrate around the protein complex. The structure and dynamics of the protein complex in the presence of the peptide were analyzed in comparison with the native 2:2:2 FGF:FGFR:HS complex (FGF-binding) and the apolipoprotein (apo) 2:2 FGFR:HS (FGF-free) complex. The details were as follows.

Topology files for the simulation systems were generated by using a CHARMM-GUI web interface, with the following options: 1) fixing deleted internal residues (residues 293 to 307) in the FGFR chain B; 2) modeling four proposed disulfide bonds (178 and 230, 277 and 341 in the FGFR chains A and B); 3) glycosylating two heparin molecules; 4) neutralizing the system by adding counter ions; and 5) solvating the entire complex with water molecules in a rectangular box. The prepared system contained approximately 200000 atoms in a box of 13.0×13.0×13.0 nm$^3$. All simulations were performed by using GROMACS version 5.0.7 under periodic boundary conditions.

The proteins, the peptides and the heparins were modeled by a CHARMM36m force field, and the water molecules were modeled by TIP3P 55. Short-range interactions were cut off at 1.2 nm by using a switching potential starting at 1.0 nm for van der Waals interactions. Long-range interactions were treated with the particle-mesh Ewald 56 with a Fourier spacing of 0.12 nm. Bonds with hydrogen atoms were constrained by using LINCS algorithm 57 and SETTLE algorithm 58, so a time step of 2 fs can be used. Production simulations were performed in the isothermal-isobaric (NPT) ensemble. A Nose Hoover thermostat was used at 300 K, with a coupling constant of 1.0 ps. The pressure was maintained at 1 atm with a Parrinello-Rahman barostat 60, with a coupling constant of 5.0 ps. All initial systems were firstly equilibrated by the canonical ensemble (NVT) with velocity generation. Production trajectories were generated by the NPT ensemble, and coordinates were saved every 10 ps for analysis.

Figure 7:
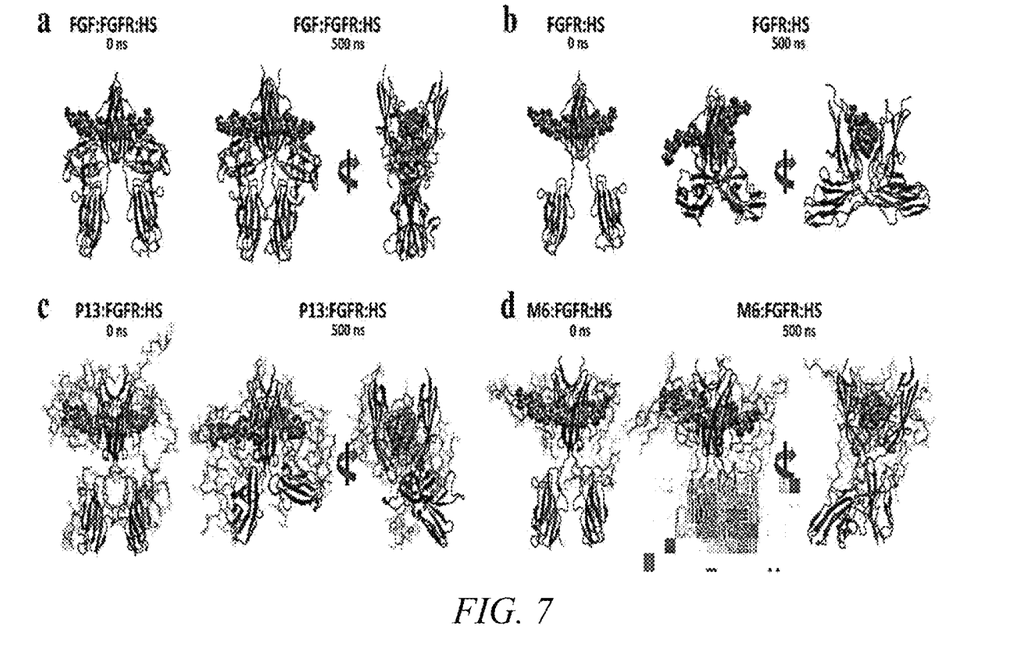
FIG. 7 shows molecular simulation diagrams of four types of simulation systems in experimental example 7 of the present disclosure.

FIG. 7 showed initial and final snapshots of 500-ns simulations of four types of systems. FIG. 7a showed the crystal FGF:FGFR:HS complex. FIG. 7b showed the apolipoprotein FGFR:HS complex; FIG. 7c showed the FGFR:HS complex of P13 with chains; and FIG. 7d showed the FGFR:HS complex of M6 with 20 chains. It should be noted that for the sake of clarity, a small amount of peptides that were not brought into contact with proteins were removed.

As can be seen from FIG. 7, multiple peptides were associated with the complex in both the upper D2 and lower D3 domains of the receptor. M6 appeared to bind more strongly and more tightly to the complex, while P13 exhibited looser binding during simulations, with frequent attachment and detachment events.

B. Determination of the Peptide Binding Factors by Calculating the Non-Binding Interaction Energy Between Peptides and Complexes by Using the Coulomb and Lennard-Jones Potentials.

Figure 8:
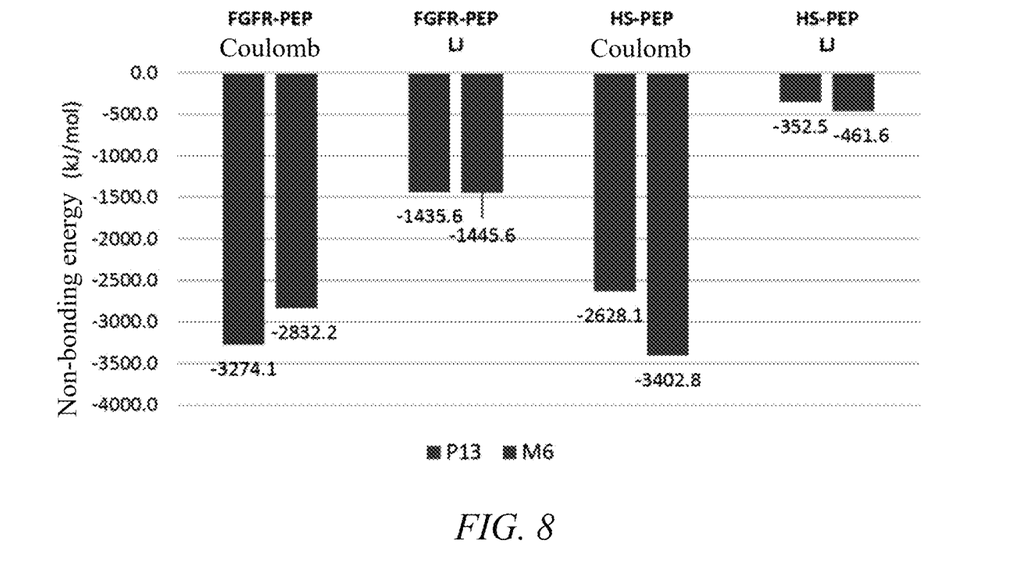
FIG. 8 shows result diagrams of non-bonding interaction energy between peptides and complexes calculated by using Coulomb and Leonard-Jones potentials in experimental example 7 of the present disclosure.

The results were as shown in FIG. 8, wherein the binding of the peptides to the complexes was mainly driven by electrostatic interaction. By comparing the energy values of M6 and P13, it can be seen that there were significant electrostatic and van der Waals interactions between the HS and the peptides (dE=−774.6 kJ/mol and −109.2 kJ/mol respectively).

On the other hand, P13 showed stronger binding to the protein in the electrostatic interaction (dE=−441.9 kJ/mol). The total non-bonding interaction energy of P13 was −7690.3 kJ/mol, and the total non-bonding interaction energy of M6 was −8142.2 kJ/mol, with a difference of −451.9 kJ/mol.

Therefore, the differential bindings of M6 and P13 to the complex induced different changes in the structure of the complex.

Experimental Example 8

For M6, the structure of the FGFR:HS complex was similar to an equilibrated FGF-binding structure, wherein the D2 and D3 domains stretched and the D3 domains of the two chains stayed in a proximal distance. In contrast, for P13, the structure of the FGFR:HS complex was closer to an equilibrated FGF-free structure, which underwent a large conformational change to adopt a significantly different fold upon the loss of its native ligand. In this regard, the structural changes of FGFR under different ligand conditions were analyzed. Please refer to FIG. 9.

Figure 9:
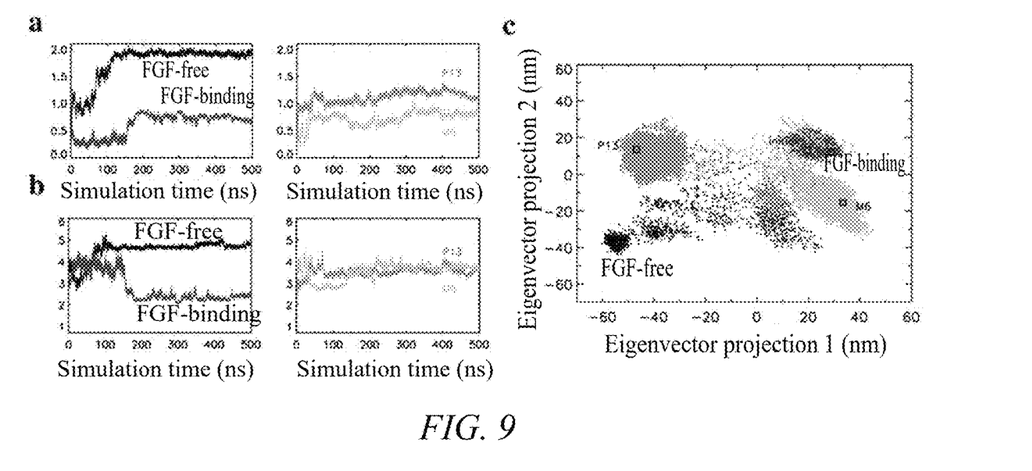
FIG. 9 shows analysis result diagrams of structural changes of an FGFR under different ligand conditions in experimental example 8 of the present disclosure.

A comparison of the root-mean-squared deviation (RMSD) of a protein backbone relative to its initial structure in FIG. 9a and the center-of-mass separation distance between the D3 domains of two FGFR chains in FIG. 9b revealed that the complicated structures of both P13 and M6 were changed almost immediately, but the changed structures reached stability at 300 ns.

The tight interactions of the D3 domains in P13 and M6 were both stable, through in a slightly large separation distance (the center-of-mass of the two domains was about 3 nm in distance, and was 2 nm in the equilibrated FGF-binding state of the crystal simulation). This finding was consistent with the result that D3 domains of two activated FGF receptors were closer by using an FRET-based technique.

Further, the conformational change of the complex during simulation was analyzed by principal component analysis (PCA). Four simulation trajectories to be compared, namely FGF-binding, FGF-free, P13 and M6, were concatenated, and the covariance matrix of positional fluctuations of protein backbone atoms was calculated. The matrix was diagonalized; and the eigenvectors and associated eigenvalues representing the axes of atomic motions and mean square fluctuations along these axes were obtained. FIG. 9c showed 2D projection of the simulation trajectories in first and second PCA modes, namely the axes of first-largest and second-largest atomic motions of the protein.

The results of PCA analysis showed that the conformational change of the protein from an initial state to an active state (the equilibrated FGF-binding form) only involved a short-distance atomic motion, while the change to an inactive state (the equilibrated FGF-free form) involved a large-scale motion corresponding to the closing action of the D2-D3 domains of the two chains.

The projection data revealed that when binding to the peptide M6, the protein maintained conformational states similar to the initial and FGF-binding forms for a period of time and then changed to a conformational state close to the FGF-binding form. With the P13, the protein underwent a relatively large motion to stay in an intermediate conformational state between the initial state and the FGF-free state. The Effects of P13 and M6 on FGF2 (16.4 kDa) and TGFβ1 (25.6 kDa Homodimer Linked by a Disulfide Bond) were Studied in Accordance with the Experimental Results of the Above Experimental Examples 1-7.

1) Effects of P13 and M6 on FGF2

Figure 10:
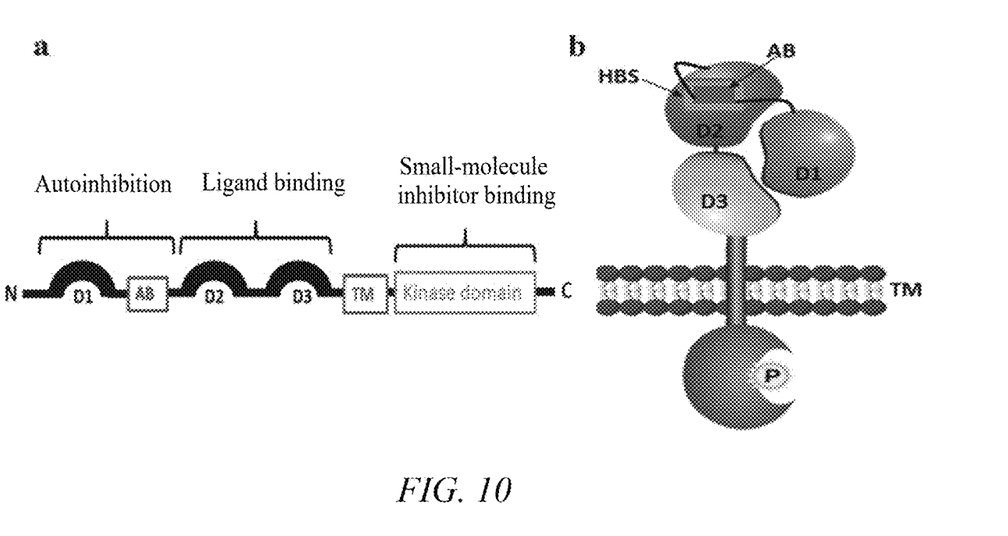
FIG. 10 shows a schematic diagram and an autoinhibition model diagram of a part of the FGFR in the experimental examples of the present disclosure.

A fibroblast growth factor receptor (FGFR) was a transmembrane protein 34 composed of three domains: an extracellular ligand-binding region, a single transmembrane portion and an intracellular kinase domain (please refer to FIG. 10a and Table 2). The extracellular region consisted of three immunoglobulin-like regions: D1, D2 and D3.

TABLE 2

Specific information of FGFR

| Name | Length (AA) | Signal peptide | D1 | D2 | D3 | Kinase domain | Heparin binding |
|------|-------------|----------------|-----|-----|-----|---------------|-----------------|
| FGFR1 | 822 | 1-21 | 25-119 | 158-246 | 255-357 | 468-767 | 160-177 |
| FGFR2 | 821 | 1-21 | 25-125 | 154-247 | 256-358 | 481-770 | 161-178 |
| FGFR3 | 806 | 1-22 | 23-126 | 151-244 | 253-355 | 472-761 | —# |
| FGFR4 | 802 | 1-21 | 22-118 | 152-240 | 249-349 | 467-755 | — |

An acid box (AB) existed between the D1 and D2 regions. The D1 and the acid box played a key role in the autoregulation of FGFR molecules, while the D2 and the D3 were ligand-binding regions. The kinase domain allowed for phosphorylation of downstream molecules and can be inhibited by small-molecule inhibitors such as AZD4547 and PD173074. The D2 region comprised a heparin-binding site.

FGFRs had their own set of intramolecular regulatory mechanisms—"autoinhibition". Please refer to FIG. 10b. The D1 competitively bound to ligand-binding sites formed by the D2 and the D3. At the same time, the acid box bound to the positively-charged "canyon" in the same receptor which also was a heparin-binding site (18AA in FGFR1: KMEKKLHAVPAAKTVKFK (six lysine residues), and 18AA in FGFR2: KMEKRLHAVPAANTVKFR (three lysine residues and two arginine residues)).

When the D1 and the acid box occupied their intramolecular binding sites, the FGFR monomer adopted a "closed" and autoinhibited configuration. However, when FGF and heparan sulfate proteoglycans (HSPGs) competed separately for the ligand-binding site and the acid box, the FGFR in the closed configuration was opened and activated. On the basis of the above unbiased evidence, it was speculated that the venom-based peptide P13 (18AA: WCYKLPDRVSIKEKGRCN (three lysine residues and two arginine residues)) and the mutant M6 (18AA: WCYKLPDRVSIERRGRCN (one lysine residue and four arginine residues)) thereof had the ability to compete for the acid box to relieve the autoinhibition of the FGFR.

An X-ray crystal structure (a ternary FGF-FGFR-heparin complex) of a dimeric complex (PDB ID: 1FQ9) confirmed two necessary prerequisites for FGFR activation: formation of two molecules of FGFR into a dimer and involvement of two molecules of heparins.

The molecules involved in FGFR activation were heparan sulfate proteoglycan (HSPG) on the cell membrane, and the two heparins used in the crystal only facilitate in vitro crystallization. The X-ray crystal structure comprised an extracellular region of FGFR1, FGF2 and heparin in a ratio of 2:2:2. The heparin bound to both two FGF2 ligands and two FGFR1 receptor molecules in the 3D structure.

Combined with experimental example 7, by taking the ternary crystal complex (PDB ID: 1FQ9) as a template, MD simulation was performed to study the energetics and dynamics of multiple peptides binding to the FGFR protein complex. A batch of peptides P13 or M6 with 20 chains were equilibrated around the 2:2 FGFR:HS complex with the FGF removed. During the equilibration where the complex was positionally restrained, it was observed that the peptides quickly bound to the complex due to their strong electrostatic attractions with FGFR and HS molecules. Subsequently, in the classical MD simulation following the equilibration, the protein complex underwent different conformational changes induced by the bound peptides P13 or M6.

Combined with experimental example 8, the effects of these conformational changes on the biological function of the FGFR were understood. The peptide simulations were compared to FGF-binding (native) and FGF-free (apolipoprotein) simulations of the complex. The simulations revealed that the conformations in the FGF-binding and FGF-free forms of the complex were significantly different. The FGF-binding complex in equilibrium was similar to its crystal structure where the D2 and D3 domains were extended, the two HS molecules tightly bound to both the D2 and the FGF, and importantly, the two D3 domains were bound together. The closer proximity of the D3 domains indicated that the complex structure was in its active state, which was consistent with the FRET-based experimental results.

In contrary, in the apolipoprotein simulation, the FGFR:HS complex which loses the FGF ligand underwent a large hinge motion by moving the lower D3 domain of an FGFR chain towards the upper D2 domain of the opposite FGFR chain. This motion occurred spontaneously and was completed in a short simulation time of 200 ns. Thereafter, the FGF binding site remained partially closed. The native and apolipoprotein simulations revealed that the D2-D3 conformations and D3-D3 domain contact were different for the activated FGFR and its inactivated counterpart.

The structural changes and energetics of the FGFR:HS complex after binding to P13 and M6 in the peptide simulations and in the native and apolipoprotein simulations were compared. The RMSD and PCA results suggested that both peptides had the ability to maintain the conformation of the complex in some intermediate forms between the active and inactive states of the FGFR.

Importantly, both peptides required tighter domain-domain contact of D3, which was critical to the signal transduction function of the FGFR. It was worth noting that, compared with P13, the structure of the M6-binding FGFR was closer to the activated FGFR, which may be due to its higher affinity to the FGFR:HS complex. Therefore, the calculation results provided some understanding on the peptide-binding modes of the FGFR to P13 and M6, and it was concluded that M6 had better proliferation activity.

2) Effects of P13 and M6 on TGFβ Receptor

In 2008, the crystal structure of two molecules of TGFβ3 binding to a heterotetramer TGFβRI/TGFβRII(2PJY) was determined at a resolution of 3.0 Å. However, the crystal structure of TGFβ binding to the corresponding receptor was a complicated heterotetramer.

TGFβ receptors were a family of Ser/Thr kinase receptors involved in the TGFβ signal pathway, and more than thirty members determined their multifunctional properties. The main functions of the TGFβ receptors comprised self-renewal of embryonic stem cells, gastrulation, differentiation, organ morphogenesis and adult tissue homeostasis. The TGFβ superfamily receptors sent signals to the family of intracellular Smad protein kinases, and these kinases further entered the cell nuclei to regulate the expression of related genes. The activation mechanism of the TGFβ receptor can be divided into three parts:

firstly, TGFβ directly bound to a constitutively active kinase TGFβ receptor II;

secondly, TGFβ was recognized by receptor I, and receptor II recruited receptor I to form a tetramer complex; and thirdly, the TGFβ receptor II allowed for the phosphorylation of the receptor I, and then transmitted the signal to a downstream substrate.

An in-depth study of the TGFβ receptor activation process revealed that glycoproteins anchored on the cell membrane were involved in the activation process, including membrane-anchored betaglycan and endoglin, and facilitated the ligand binding to the TGFβ receptor.

The extracellular structure of the TGFβ receptor was similar to the structure of a three-finger toxin, and the extracellular structure of FGFR also had an immunoglobulin-like scaffold. Although there were some differences between the extracellular structures of the two receptors, one of the common features was the involvement of extracellular proteoglycan with a separate domain when the signaling pathway was activated.

The activation mode of the FGFR was to "pull/drag" two monomer receptors into a dimer, while the activation mode of the TGFβ receptor was to dimerize a homodimer of TGFβ receptor II and a homodimer of TGFβ receptor I into a heterotetramer so as to activate downstream signaling pathways.

Assuming that any molecule had the ability to "dimerize" the FGFR and the TGFβ receptors and activate their corresponding signaling pathways, on the basis of the above experimental data, it was speculated that potential molecular mechanisms of the venom peptide P13 and the mutant M6 thereof had high affinity to heparan sulfate and the ability to cooperate with the proteoglycan to activate TGF and FGF signaling pathways.

In summary, the P13 and the mutant thereof were the first venom-based peptide discovered by means of this study, and acted on the FGF and TGF-β signaling pathways to promote the self-renewal abilities of the hESCs.

The above is only preferred examples of the present disclosure, and is not intended to limit the present disclosure. For a person skilled in the art, the present disclosure may have various changes and variations. Any modification, equivalent substitution, improvement, etc. made within the spirit and principle of the present disclosure shall fall within the scope of protection of the present disclosure.

INDUSTRIAL PRACTICABILITY

The present disclosure provides a venom-based peptide, and the amino acid sequence of the peptide is represented by formula 1: X1-X2-X3-X4-X5-X6-X7-X8-X9-X10-X11-X12-X13-X14-X15-X16-X17-X18; wherein X1, X5, X6, X9 and X11 are each selected from any one among A, V, L, I, M, F, W and P; X2, X3, X10, X15, X17 and X18 are each selected from any one among G, C, S, T, Y, N and Q; X7 is selected from D or E; X4, X8 and X16 are each selected from any one among K, R and H; and X12, X13 and X14 are each selected from any one among K, R, H, D and E. The peptide has the function of promoting self-renewal of human embryonic stem cells.

What is claimed is:

1. A venom-based peptide having an amino acid sequence consisting essentially of WCYKLPDRVSI-X12-X13-X14-G-X16-CN; wherein
X12 is K or E;
X13 is R or E;
X14 is R or K; and
X16 is R or K; and
wherein the venom-based peptide is 18 amino acids in length.

2. The venom-based peptide according to claim 1, wherein the amino acid sequence of the peptide is represented by SEQ ID NO: 1 or SEQ ID NO: 2.

3. The venom-based peptide according to claim 2, wherein the amino acid sequence of the peptide is represented by SEQ ID NO: 2.

4. A culture medium for culturing a human embryonic stem cell, wherein components of the culture medium comprise the venom-based peptide according to claim 1.

5. The culture medium for culturing the human embryonic stem cell according to claim 4, wherein the venom-based peptide in the culture medium has a concentration of 50-200 µM; and
the culture medium further comprises at least one of or a combination of more than one of the following components: DMEM/F12, FGF2, TGFβ1, insulin, L-ascorbic acid, selenium, NaHCO$_3$ and transferrin.

6. The culture medium for culturing the human embryonic stem cell according to claim 5, wherein the peptide in the culture medium has a concentration of 50 μM, 55 μM, 60 μM, 65 μM, 70 μM, 75 μM, 80 μM, 85 μM, 90 μM, 95 μM, 100μ, 105 μM, 110 μM, 115 μM, 120 μM, 125 μM, 130 μM, 135 μM, 140 μM, 145 μM, 150 μM, 155 μM, 160 μM, 165 μM, 170 μM, 175 μM, 180 μM, 185 μM, 190 μM, 195 UM or 200 μM.

7. The culture medium for culturing the human embryonic stem cell according to claim 4, wherein the components of the culture medium are a polypeptide with a sequence represented by SEQ ID NO: 1 and/or a polypeptide with a sequence represented by SEQ ID NO: 2 added on the basis of a basal culture medium.

8. The culture medium for culturing the human embryonic stem cell according to claim 7, wherein the basal culture medium is a 6TM culture medium, a culture medium composed of a 6TM culture medium+TGFβ, or a culture medium composed of a 6TM culture medium+FGF2.

9. The culture medium for culturing the human embryonic stem cell according to claim 8, wherein the 6TM culture medium has the following 6 components: DMEM/F12, insulin, L-ascorbic acid, selenium, $NaHCO_3$ and transferrin.

10. A formulation for activating TGF and/or FGF signaling pathways, wherein the formulation comprises the venom-based peptide according to claim 1;
the FGF signaling pathway refers to Erk1/2 signaling stimulated by FGF; and
the TGF signaling pathway refers to SMAD2/3 signaling stimulated by TGFβ.

11. A formulation for promoting the dimerization of an FGFR and a TGFβ receptor, characterized in that, the formulation comprises the venom-based peptide according to claim 1.

12. A formulation for promoting the expression of a regulatory factor, wherein the formulation comprises the venom-based peptide according to claim 1, and the regulatory factor is selected from any one of or a combination of more than one of the followings: OCT4, SOX2 and NANOG.

13. The venom-based peptide according to claim 2, wherein the amino acid sequence of the peptide is represented by SEQ ID NO: 1.

* * * * *